(12) United States Patent
Hoetger

(10) Patent No.: US 7,399,538 B2
(45) Date of Patent: Jul. 15, 2008

(54) LOW-FRICTION AND LOW-WEAR SOLID BODY SLIDING SYSTEM

(75) Inventor: Michael Hoetger, Berlin (DE)

(73) Assignee: AMOVIS GmbH, Berlin (DE)

( * ) Notice: Subject to any disclaimer, the term of this patent is extended or adjusted under 35 U.S.C. 154(b) by 259 days.

(21) Appl. No.: 10/515,798

(22) PCT Filed: May 8, 2003

(86) PCT No.: PCT/EP03/04817

§ 371 (c)(1),
(2), (4) Date: Nov. 23, 2004

(87) PCT Pub. No.: WO03/100300

PCT Pub. Date: Dec. 4, 2003

(65) Prior Publication Data

US 2006/0099434 A1  May 11, 2006

(30) Foreign Application Priority Data

May 28, 2002 (DE) ................................ 102 23 836

(51) Int. Cl.
 *B32B 19/00* (2006.01)
(52) U.S. Cl. ..................... 428/701; 428/702; 428/689; 428/472
(58) Field of Classification Search ...................... None
 See application file for complete search history.

(56) References Cited

U.S. PATENT DOCUMENTS

| 4,798,771 | A | * | 1/1989 | Vogel | ............................. 428/564 |
| 4,961,913 | A | * | 10/1990 | Sullivan | ....................... 423/351 |
| 5,401,574 | A | * | 3/1995 | Masutani et al. | ............. 428/338 |
| 5,927,861 | A | * | 7/1999 | Yamashita et al. | ........... 384/287 |

* cited by examiner

*Primary Examiner*—Timothy M. Speer
*Assistant Examiner*—Gordon R Baldwin
(74) *Attorney, Agent, or Firm*—Thorpe North & Western LLP

(57) ABSTRACT

A solid body tribological pairing for machine parts comprising a first slide element from a first basic material and a second slide element from a second basic material is characterized in that at least one of the slide elements comprises a lubricant in the form of a hydroxide compound introduced into the basic material before its use as a machine part.

19 Claims, 1 Drawing Sheet

LOW-FRICTION AND LOW-WEAR SOLID BODY SLIDING SYSTEM

TECHNICAL FIELD

The invention relates to a solid body tribological pairing for machine parts comprising a first slide element from a first basic material and a second slide element from a second basic material. Such solid body tribological pairings are used without lubricants and, therefore, are particularly ecological and require little servicing.

Such tribological pairings involve the problem that the aim is a surface which is as hard as possible and which suffers little wear and abrasion. Metal oxides, for example, are used for such surfaces. On the other hand the surface shall have soft components to reduce the friction. These are, for example, graphite or lead. Furthermore the surface must not corrode or otherwise suffer when exposed to a water steam-containing atmosphere at high temperatures and high pressures.

PRIOR ART

From DE 101 28 055 a solid body tribological pairing is known having a first slide element, for example a piston, essentially consisting of a carbon material which is not graphitized, and a second slide element, for example a cylinder, made of iron containing, high temperature resistant material alloyed with chromium or nickel which is provided with a nitride layer at its sliding surface. In the printed publication a surface with a metal oxide layer thereon is disclosed. Furthermore the impregnation of sliding surfaces with fillers and the deposition of layers protective against abrasion are disclosed, such layers consisting of titanium nitride, chromium nitride and chromium carbide as well as amorphous, diamond-like carbon (DLC).

From DE 101 35 477.0 (not published yet) a tribological pairing is known wherein a first slide element is made on the basis of carbon and the second slide element consists of zirconium dioxide coated with zirconium hydroxide. Furthermore it is known from said application to coat the surfaces of the first slide element with zircon hydroxide. Such coatings usually are produced by means of difficult and expensive methods such as thin layer- and thin film-methods which need to be carried out in clean rooms to obtain suitable surfaces. Such tribological pairings, therefore, are very expensive.

DISCLOSURE OF THE INVENTION

It is an object of the invention to provide tribological pairings of the above mentioned kind which simultaneously involve low friction and abrasion and which operate without an expensive and difficult coating process of the slide elements. Furthermore, it is an object of the invention to provide such tribological pairings for machine parts exposed to water steam at high pressure and temperature levels.

According to the invention these objects are achieved in that at least one of the slide elements comprises a lubricant in the form of a hydroxide compound introduced into the basic material before it is used as a machine part. The hydroxide compound is then present as a lubricant regardless of the operating environment. When the hydroxide compound is introduced into the basic material it is even then uniformly present at the surface if abrasion and wear occurs. Furthermore good friction properties can be achieved with little abrasion without the requirement of an expensive and difficult coating process. These properties are more or less achievable for all basic materials.

The hydroxides can be generated in a chemical reaction during the production process of the basic material or they can be inserted by a defined insertion process. The hydroxides may also be formed during the process, for example from the elements. This, however, is not possible for all tribological pairings. Furthermore it then depends on the atmosphere, whether hydroxides are formed. The insertion into the basic material before the use as a machine part is, therefore, particularly advantageous.

In an embodiment of the invention hydroxide compounds of the elements of the third, fourth or fifth chemical main group of the periodic table of chemical elements (group 13 to 15) or the third, fourth or fifth subgroup of the periodic table of chemical elements (group 3 to 5) are used. These are especially the hydroxides of antimony (Sb), bismuth (Bi), arsenic (As), aluminum (Al), indium (In), lead (Pb), tin (Sn), zirconium (Zr) or titanium (Ti). These alloy or insertion components serve to minimize the dry friction while a slide film is automatically formed during operation. The formed slide layer provides extremely low friction.

Normal ferritic or austenitic steel or other high temperature resistant and corrosion resistant steel may be used as basic materials which may be alloyed to a higher or lesser degree. Preferred basic materials for at least one slide element are nodular graphite cast iron (GGG), malleable cast iron, gray cast iron or cast steel (G). The cast iron can be an alloy with 25 to 40 percent of nickel and/or 3 to 25 percent of chromium. The nickel and chromium component causes a reduction of the abrasion and wear and it is slightly protective towards corrosion. The lubricant can be inserted into the melting or during a sintering process. This can be achieved by dissolving the lubricant in the melting of the basic material and defined cooling forming very fine functional particles from possible hypereutectic melting. The insertion of the lubricant can also be achieved by diffusion from a suitable gas phase or melting into the basic material which may be already processed.

The slide element or the slide elements can also completely consist of the hydroxide serving as a lubricant. In this case hydroxides also serve as a basic material. Basic materials like aluminum hydroxide, magnesium hydroxide, titanium hydroxide, zirconium hydroxide, lead hydroxide and/or bismuth hydroxide are particularly suitable. These are easy to produce hydroxides. Especially zirconium compounds are highly durable ceramic materials which can sustain high tensile stress, compressive strain and shearing strain.

Alternatively at least one slide element can have synthetic material as a basic material, especially duroplastic or thermoplastic material. The lubricant is then mixed into the plastic mold during the production. Furthermore nickel and cobalt alloys are very suitable as basic materials. The hydroxides are then inserted into the melting of such alloys. Non-ferrous heavy metal alloys, for example, those based on copper and tin, such as brasses, bronzes, etc., may be used and provide protection against high abrasion. Materials from the mechanical micro- or nano-technologies, engineering ceramics and titanium silicon carbide which are very processable are also suitable due to their properties.

Preferably the first slide element is provided with a lubricant in the form of a hydroxide compound of one element and the second slide element comprises the oxide compound of the same element. Alternatively the second slide element is coated with the oxide compound. Such oxide compounds can be the compounds of zirconium, aluminum and titanium. Good abrasive characteristics are achieved by such oxide compounds while the hydroxide compounds provide good frictional characteristics. The oxide compounds can alternatively be formed during the operation from the elements in an oxidizing atmosphere. Instead of oxide compounds nitride or carbide compounds can be used depending on the kind of metal. Here also very hard surfaces can be achieved.

The aforementioned materials provide improved dry friction characteristics even in an oxidizing environment with water steam, supercritical water or liquid water at temperatures between 200° C. and 800° C.

Further modifications of the invention are subject matter of the sub-claims. An embodiment is described below in greater detail.

DESCRIPTION OF THE EMBODIMENTS

A piston-cylinder arrangement for steam engines forms a tribological pairing. The arrangement is exposed to steam at temperatures between 300° C. and 850° C. The piston consists of solid zirconium oxide. The cylinder consists of a compound matrix of zirconium hydroxide/metal.

In a further embodiment a piston-cylinder arrangement is provided for steam engines. The piston and the cylinder consist of nodular graphite cast iron (GGG), which has aluminum hydroxide inclusions. The frictional behaviour is additionally supported by the graphite contained in the nodular graphite cast iron.

A further embodiment is a piston-cylinder arrangement of an oil-free combustion engine. The cylinder consists of a gray cast iron matrix or nodular graphite cast iron matrix containing zirconium hydroxide. The piston is made of carbon and impregnated with antimony. The piston rings consist of zirconium oxide or cast steel. During operation the tribological partners run on a zirconium hydroxide film continuously renewing itself. The process is supported by a graphite film of carbon from the piston and the metal matrix.

Figure 1D:
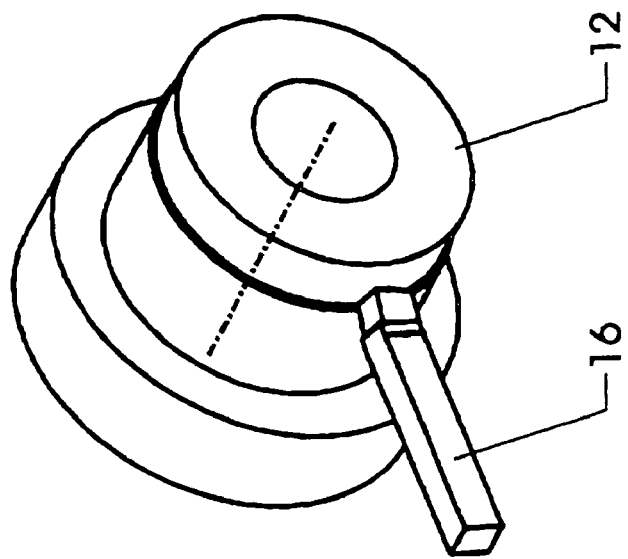
FIG. 1a-d is a schematic representation of the manufacturing process of the tribological partners
Figure 1C:
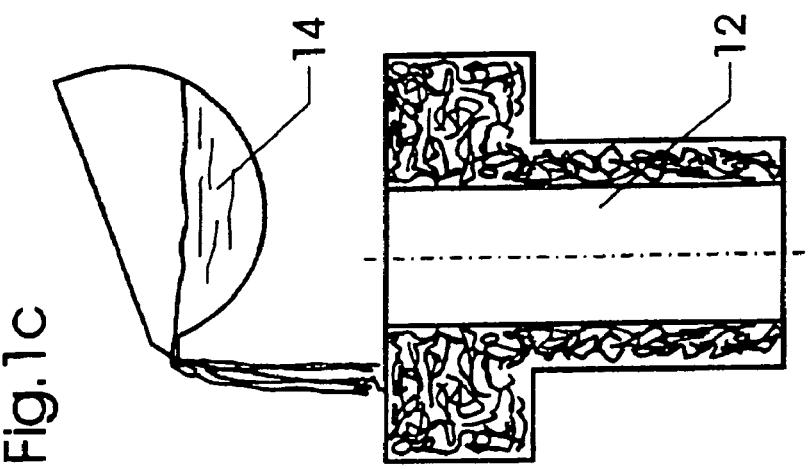
Figure 1A:
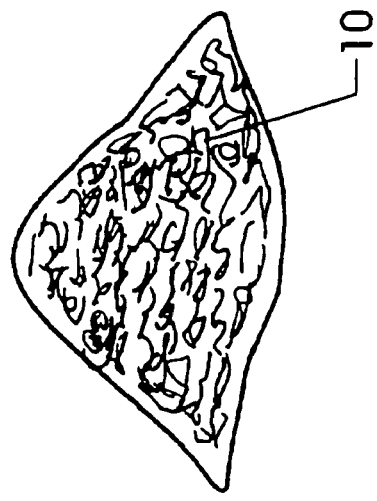
Figure 1B:
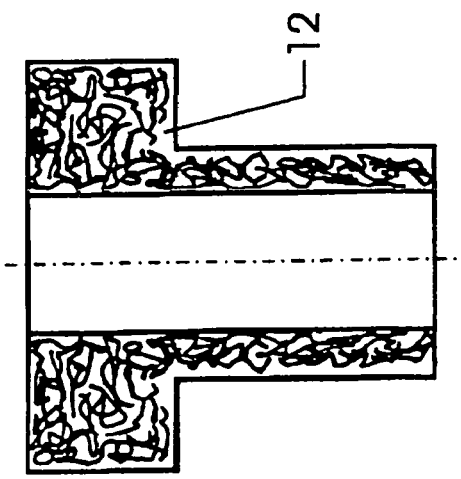

The production of the slide elements is carried out according to a process shown in FIGS. 1a to 1d. Loose hydroxide powder 10 shown in FIG. 1a is processed to a loosely compressed hydroxide cylinder 12 as shown in FIG. 1b. In a step represented in FIG. 1c metal 14, for example nodular graphite cast iron GGG, is poured on the hydroxide cylinder. Finally the cylinder is finished by processing with, for example, a cutting tool 16. In such a way it is possible to produce components with mixed materials which normally cannot be mixed due to the ascending forces in the melting or due to too hot melting, etc. The production method is also suitable for grinds with silicium carbide and aluminum.

The invention claimed is:

1. A solid body tribological pairing for machine parts comprising a first solid slide element from a first basic material and a second solid slide element from a second basic material, wherein the first solid slide element is provided with a lubricant in the form of a hydroxide compound of one element introduced into the basic material of the first solid slide element before its use as a machine part, and the second slide element comprises the oxide compound of the same element.

2. A tribological pairing according to claim 1, wherein the oxide compound is the compound of zirconium, aluminum and/or titanium.

3. A tribological pairing according to claim 1, wherein a material selected from the group of nodular graphite cast iron (GGG), malleable cast iron (GG), gray cast iron or cast steel (G) is used as basic material for the first slide element.

4. A tribological pairing according to claim 3, wherein the cast iron is an alloy with 25 to 40 percent of nickel and/or 3 to 25 percent of chromium.

5. A tribological pairing according to claim 4, wherein the cast iron is an alloy with 25 to 40 percent of nickel and/or 12 to 25 percent of chromium.

6. A tribological pairing according to claim 1, wherein the first slide element consists of zirconium hydroxide.

7. A tribological pairing according to claim 1, wherein the first slide element uses synthetic material as a basic material.

8. A tribological pairing according to claim 1, wherein the first slide element uses nickel or cobalt alloys as a basic material.

9. A tribological pairing according to claim 1, wherein at least one slide element comprises graphite additionally to said lubricant.

10. A solid body tribological pairing for machine parts comprising a first solid slide element from a first basic material and a second solid slide element from a second basic material, wherein the first slide element is provided with a lubricant in the form of a hydroxide compound of zirconium introduced into the first basic material before its use as a machine part and the second slide element comprises the oxide compound of zirconium.

11. A solid body tribological pairing for machine parts comprising a first solid slide element from a first basic material and a second solid slide element from a second basic material, wherein the first slide element is provided with a lubricant in the form of a hydroxide compound of zirconium introduced into the first basic material before its use as a machine part and the second slide element comprises a nitride or carbide compound of zirconium or is coated therewith.

12. A solid body tribological pairing for machine parts comprising a first solid slide element from a first basic material and a second solid slide element from a second basic material, wherein the first solid slide element is provided with a lubricant in the form of a hydroxide compound of one element introduced into the basic material of the first solid slide element before its use as a machine part and the second slide element comprises a nitride or carbide compound of the same element or is coated therewith.

13. A tribological pairing according to claim 12, wherein a material selected from the group of nodular graphite cast iron (GGG), malleable cast iron (GG), gray cast iron or cast steel (G) is used as basic material for the first slide element.

14. A tribological pairing according to claim 13, wherein the cast iron is an alloy with 25 to 40 percent of nickel and/or 3 to 25 percent of chromium.

15. A tribological pairing according to claim 14, wherein the cast iron is an alloy with 25 to 40 percent of nickel and/or 12 to 25 percent of chromium.

16. A tribological pairing according to claim 12, wherein the first slide element consists of zirconium hydroxide.

17. A tribological pairing according to claim 12, wherein the first slide element uses synthetic material as a basic material.

18. A tribological pairing according to claim 12, wherein the first slide element uses nickel or cobalt alloys as a basic material.

19. A tribological pairing according to claim 12, wherein at least one slide element comprises graphite additionally to said lubricant.

* * * * *